US012616080B2

(12) United States Patent
Kowalchuk

(10) Patent No.: US 12,616,080 B2
(45) Date of Patent: May 5, 2026

(54) COMPARTMENT PROFILE MONITORING AND CONTROL SYSTEM FOR AN AGRICULTURAL SYSTEM

(71) Applicant: CNH Industrial Canada, Ltd., Saskatoon (CA)

(72) Inventor: Trevor Lawrence Kowalchuk, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 795 days.

(21) Appl. No.: 17/879,643

(22) Filed: Aug. 2, 2022

(65) Prior Publication Data

US 2024/0040956 A1 Feb. 8, 2024

(51) Int. Cl.
 A01C 7/10 (2006.01)
 B65G 53/16 (2006.01)
 (Continued)

(52) U.S. Cl.
 CPC ............ A01C 7/102 (2013.01); G01F 13/001 (2013.01); G05B 15/02 (2013.01); *A01C 7/105* (2013.01);
 (Continued)

(58) Field of Classification Search
 CPC ....... A01C 7/102; A01C 7/105; G01F 13/001; G01F 1/007; G01F 13/006; G01F 23/292; G05B 15/02; B65G 53/16
 See application file for complete search history.

(56) References Cited

U.S. PATENT DOCUMENTS 4,288,814 A 9/1981 Talley et al.
4,365,268 A 12/1982 Allen et al.
 (Continued)

FOREIGN PATENT DOCUMENTS

AU 2697999 A 7/1999
DE 202019102377 U1 5/2019

OTHER PUBLICATIONS

Deshpande, Aditya M., et al., Computer Vision Toolkit for Non-invasive Monitoring of Factory Floor Artifacts, ScienceDirect, 2020, pp. 1020-1028, Published by Elsevier B.V., https://www.sciencedirect.com/science/article/pil/S2351978920315936.

(Continued)

*Primary Examiner* — Lisa M Caputo
*Assistant Examiner* — Christian T Bryant
(74) *Attorney, Agent, or Firm* — Fletcher Yoder, P.C.

(57) ABSTRACT

A storage compartment profile monitoring and control system for an agricultural system may include at least one sensor configured to output sensor signals indicative of a corresponding series of images of particulate material within a storage compartment and at least one graduated marking on the storage compartment during a period of operation of a metering system and a controller comprising a memory and a processor. The controller is communicatively coupled to the at least one sensor and configured to receive the sensor signals from the at least one sensor to determine a series of profiles of the particulate material within the storage compartment based on the series of images. The controller also determines a volumetric rate of change of the particulate material based on the series of profiles and control controls the metering system based on the change.

19 Claims, 4 Drawing Sheets

(51) Int. Cl.

| | |
|---|---|
| *G01F 1/00* | (2022.01) |
| *G01F 13/00* | (2006.01) |
| *G01F 23/292* | (2006.01) |
| *G05B 15/02* | (2006.01) |

(52) U.S. Cl.

CPC .............. *B65G 53/16* (2013.01); *G01F 1/007* (2013.01); *G01F 13/006* (2013.01); *G01F 23/292* (2013.01)

(56) References Cited

U.S. PATENT DOCUMENTS

| | | | |
|---|---|---|---|
| 4,555,725 | A | 11/1985 | Geiersbach et al. |
| 4,769,700 | A | 9/1988 | Pryor |
| 5,240,079 | A | 8/1993 | Schmidt |
| 5,956,079 | A | 9/1999 | Ridgley |
| 6,954,999 | B1 | 10/2005 | Richardson et al. |
| 7,147,241 | B2 | 12/2006 | Beaujot et al. |
| 8,184,848 | B2 | 5/2012 | Wu et al. |
| 8,190,364 | B2 | 5/2012 | Rekow |
| 8,695,396 | B2 | 4/2014 | Landphair et al. |
| 8,706,341 | B2 | 4/2014 | Madsen et al. |
| 9,114,832 | B2 | 8/2015 | Wang et al. |
| 9,255,811 | B2 | 2/2016 | Edelen |
| 9,374,939 | B2 | 6/2016 | Pickett et al. |
| 9,566,911 | B2 | 2/2017 | Greenwood et al. |
| 9,773,320 | B2 | 9/2017 | Satish et al. |
| 9,840,895 | B1 | 12/2017 | Kuhn |
| 10,143,126 | B2 | 12/2018 | Foster et al. |
| 10,251,329 | B2 | 4/2019 | Foster et al. |
| 10,395,357 | B2 | 8/2019 | Vivet et al. |
| 10,504,231 | B2 | 12/2019 | Fiala |
| 10,527,480 | B2 | 1/2020 | Cipullo et al. |
| 10,699,433 | B2 | 6/2020 | Bai et al. |
| 11,191,207 | B2 | 12/2021 | Harmon et al. |
| 2015/0153456 | A1 | 6/2015 | Feller et al. |
| 2017/0006759 | A1 | 1/2017 | Adamchuk et al. |
| 2017/0208742 | A1 | 7/2017 | Ingibergsson et al. |
| 2019/0197466 | A1 | 6/2019 | Hand, III et al. |
| 2019/0230848 | A1* | 8/2019 | Forrest ................... A01C 7/105 |
| 2020/0019858 | A1 | 1/2020 | Han et al. |
| 2020/0029495 | A1* | 1/2020 | Kowalchuk .......... A01C 15/122 |
| 2020/0198587 | A1 | 6/2020 | Du et al. |
| 2020/0245534 | A1* | 8/2020 | Pidwerbesky ...... B01F 35/2209 |
| 2020/0245542 | A1* | 8/2020 | Stuart ..................... B01F 27/72 |
| 2020/0245543 | A1* | 8/2020 | Collins .............. B01F 35/2212 |
| 2020/0359543 | A1 | 11/2020 | Dix |
| 2022/0015283 | A1* | 1/2022 | Snipes ..................... G01F 1/00 |
| 2022/0240442 | A1* | 8/2022 | Hubner .................. G01N 21/25 |

OTHER PUBLICATIONS

Li, X., et al., A Method of Automatic Measurement for Liquid Level in Standard Metal Tank, WIT Transactions on Engineering Sciences, 2016, pp. 250-258, vol. 113, WIT Press, https://www.witpress.com/Secure/elibrary/papers/IWAMA15/IWAMA15029FU1.pdf.

"Agriculture Camera Systems," Agricultural Back-Up Cameras and Rear View Camera Kits, Camera Source, https://camera-source.com/agriculture-cams.html, retrieved Mar. 23, 2017, 7 pgs.

\* cited by examiner

80

RECEIVE USER INPUT — 82

DETERMINE AN INPUT RATE IS WITHIN AN EXPECTED RANGE

84

NO → OUTPUT A SIGNAL — 86

YES

88 — INITIATE PARTICULATE MATERIAL DISTRIBUTION

90 — RECEIVE SENSOR DATA

DETERMINE A VOLUMETRIC RATE OF CHANGE OF THE PARTICULAR MATERIAL DISTRIBUTION

91

DETERMINE A DISTRIBUTION RATE IS AS THE INPUT RATE

NO

92

YES

CONTINUE PARTICULATE MATERIAL DISTRIBUTION

94

COMPARTMENT PROFILE MONITORING AND CONTROL SYSTEM FOR AN AGRICULTURAL SYSTEM

BACKGROUND

The present disclosure relates generally to a compartment profile monitoring and control system for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are towed behind a work vehicle, such as a tractor. Seeding implements generally contain a particulate material, such as seed, fertilizer, other agricultural product, or a combination thereof, which is distributed on or in the ground using various methods. Certain seeding implements include a storage tank, in which the particulate material is stored, and a metering system configured to meter the particulate material from the storage tank. The particulate material is distributed from the metering system to row units, which are configured to distribute the particulate material on or in the ground. As the storage tank is filled with the particulate material and/or while the particulate material flows from the storage tank to the metering system, a profile of the particulate material may be monitored. However, monitoring the profile of particulate material may be difficult because sensors (e.g., mechanical sensors, etc.) may become plugged with dust or dirt, sensors (e.g., electrical conductivity sensors, etc.) may become coated with particulate material, and the particulate material may clump with in the storage tank. An inaccurate measurement of the particulate material within the storage tank may lead to unexpected termination of the particulate material flow and/or an inconsistent flow of the particulate material to certain regions of a field. As a result, the crop yield within these regions may be reduced, thereby reducing the effectiveness of the seeding process.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

A storage compartment profile monitoring and control system for an agricultural system includes at least one sensor configured to output a series of sensor signals indicative of a corresponding series of images of particulate material within a storage compartment and at least one graduated marking on the storage compartment during a period of operation of a metering system configured to meter the particulate material from the storage compartment and a controller comprising a memory and a processor. The controller is communicatively coupled to the at least one sensor and the controller is configured to receive the series of sensor signals from the at least one sensor and determine a series of profiles of the particulate material within the storage compartment based on the series of images. The controller is also configured to determine a volumetric rate of change of the particulate material based on the series of profiles and control the metering system based on the volumetric rate of change.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
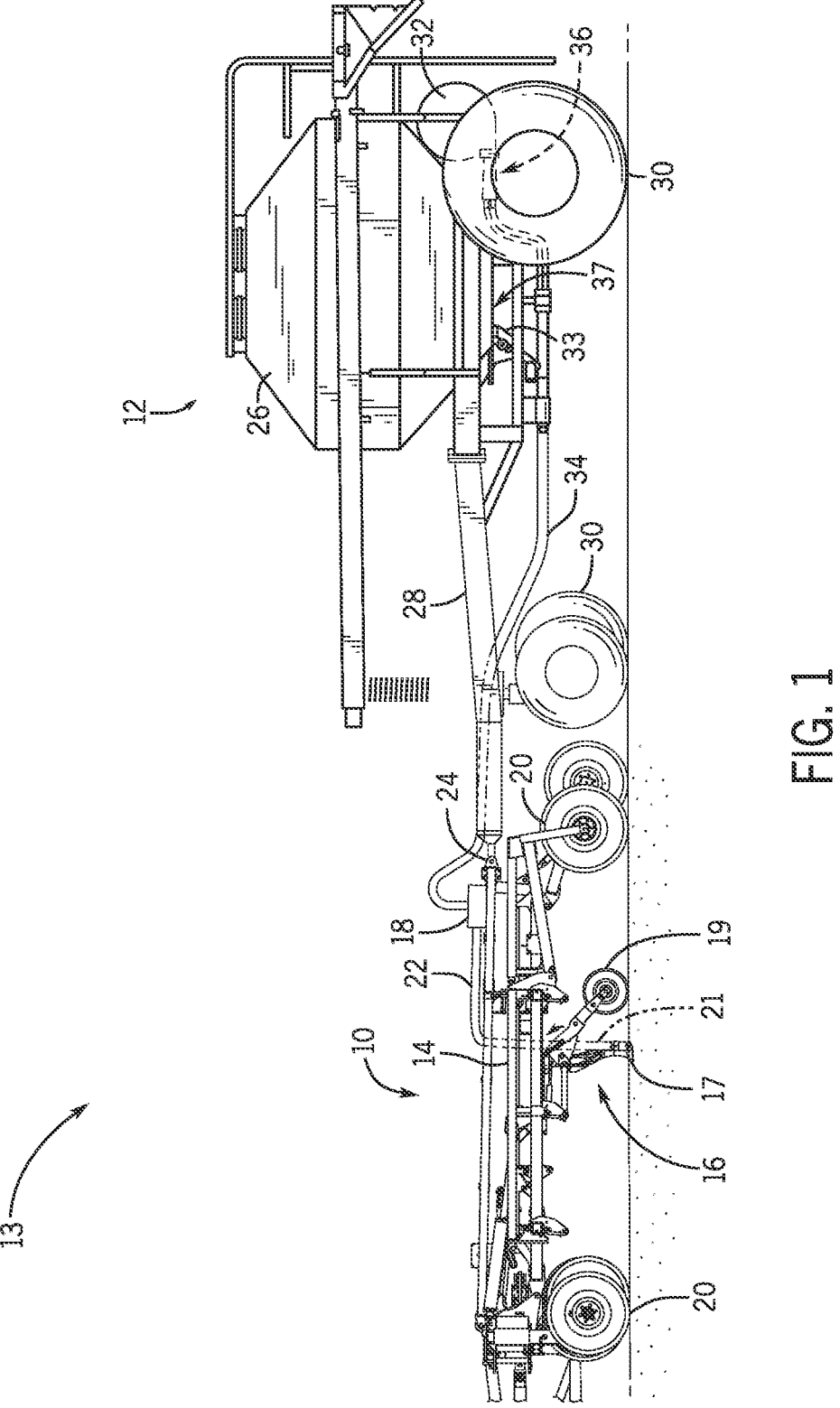
FIG. 1 is a side view of an embodiment of an agricultural implement coupled to an embodiment of an air cart.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a compartment monitoring and control system configured to monitor a profile of particulate material. Certain agricultural systems (e.g., air carts, seeding implements, etc.) contain a particulate material (e.g., seed, fertilizer, granular product, other agricultural product(s), or a combination thereof) within a storage compartment of the agricultural system. The particulate material may flow from the storage compartment through a metering system, which is configured to control the flow of the particulate material to the field. As the storage compartment is filled with the particulate material and as the particulate material flows from the storage compartment through the metering system, a profile (e.g., level, height, etc.) of the particulate material within the storage compartment may vary.

Accordingly, in certain embodiments, a compartment monitoring and control system includes a user interface, one or more graduated markings, at least one sensor, and a metering system with a drive system. The user interface is configured to enable the operator to control certain parameters associated with operation of the compartment monitoring and control system. For example, the user interface is configured to receive operator inputs, such as an input rate, a type of particulate material, an amount of particulate material, a length of operation, a threshold particulate material flow rate, or a combination thereof. For example, an operator may enter an input via the display a type of particulate material and an input rate (e.g., distribution rate of the particulate material) within the storage compartment and the user interface is configured to output the input(s) to the controller. The controller is configured receive a signal from the input indicative of the input rate and retrieve data regarding the particulate material. The information regarding the particulate material includes, but is not limited to, an input rate (e.g., seeding rate), a tolerance interval, a particulate size (e.g., a seed size), and/or a particulate shape. The particulate material may have a threshold particulate material flow rate range to account for different grain shapes and/or sizes of the particulate material. The tolerance interval may be a standard deviation of error that takes into account the different sizes and shapes. The controller is configured to determine if the input rate matches the data for the particulate material. If the input rate does not match the data, then the compartment monitoring and control system is configured to output a notification the operator. If the input rate matches the data, then the compartment monitoring and control system is configured to initiate particulate material distribution. Activation causes a release of particulate material from the storage compartment to the metering system to a field. As such, a profile (e.g., level) of the particulate material may change within the storage compartment.

During operation, the compartment monitoring and control system is configured to determine if the distribution rate is the same as the input rate based on sensor data received from at least one sensor within the storage compartment. The storage compartment may have one or more graduated markings on surface and may be coupled to at least one sensor configured to generate data of the interior of the storage compartment at any suitable time interval. The controller is configured to receive sensor signal(s) and determine a profile (e.g., height, level) of the particulate material within the storage component based on the sensor signal(s). For example, the controller is configured to determine a height of the particulate material relative to the storage compartment based on the graduated markings and monitor the height of the particulate material over time. In an embodiment, the controller is configured to determine a volumetric rate of change of the particulate material based on the profiles determine a distribution rate based on a sensor signal received from one or more sensors within the storage tank indicative of the profile of particulate material. With the volumetric rate of change, the controller is also configured to determine the particulate material distribution rate. The distribution rate may be based on the grain shape and/or size of the particulate material, the implement type, the type of particulate material being distributed, the operation being performed, etc.

The compartment monitoring and control system is configured to determine if the distribution rate is the same as the input rate. For example, the controller is configured to determine if the distribution rate is within the threshold range of distribution for the type of particulate material. If the distribution rate is within the threshold range, the controller is configured to output a control signal to the metering system indicative of continuing operation. In certain embodiments, the controller is configured to continue distribution operations by not outputting a control signal, thereby allowing the metering system to continue operation. If the distribution rate is not within the threshold range, the controller is configured to output a control signal to notify the operator. In certain embodiments, the controller is configured to adjust one or more parameters affecting distribution. In other embodiments, the controller is configured to terminate operation by outputting a control signal to the metering system.

The compartment monitoring and control system process may monitor the profile of the particulate material while particulate material is being distributed to the field and while the storage tank is being filled with the particulate material. Furthermore, the compartment monitoring and control system described herein may be installed in both new and existing agricultural systems. Installation of the compartment monitoring and control system includes disposing at least one sensor within the storage compartment and the metering system in a bottom portion of the storage compartment of the agricultural system. Both the sensor and the metering system may be secured to the storage compartment via various interface and mounting features, such as fasteners, tab extensions, etc. The at least one sensor may include a camera configured to transmit sensor signal(s) indicative of the profile of the particulate material within the storage compartment. Additionally or alternatively, the metering system may include the drive system having at least one motor configured to drive the particulate material distribution. Alternatively, existing motors within the agricultural system are configured to initiate and continue the particulate material distribution.

With the foregoing in mind, the present embodiments relating to a compartment monitoring and control system may be utilized within any suitable agricultural system. For example, FIG. 1 is a side view of an embodiment of an agricultural implement 10 coupled to an embodiment of an air cart 12, which form an agricultural system 13. A compartment monitoring and control system may be used in the air cart 12. As depicted, the agricultural implement 10 includes a tool frame 14 coupled to wheel assemblies 20. The agricultural implement 10 may be pulled by a work vehicle (e.g., a tractor) to deposit rows of particulate material (e.g., granular product, agricultural product, etc.). The wheel assemblies 20 may contact the surface of the soil to enable the agricultural implement 10 to be driven through the field by the work vehicle. As the agricultural implement 10 is driven through the field, one or more rows of the particulate material may be deposited into the soil by row units 16 (e.g., ground engaging opener assemblies). Although only one row unit 16 is shown, the agricultural implement 10 may include multiple row units 16 organized in one or more rows across the agricultural implement 10.

To facilitate depositing the particulate material, each row unit 16 (e.g., ground engaging opener assembly) includes an opener 17, a press wheel 19, and a particulate material tube 21. While the opener 17 engages the soil, the opener 17 may exert a force onto the soil that excavates a trench into the soil as the row unit 16 travels through the field. The particulate material may be deposited into the excavated trench via the particulate material tube 21. Then, the press wheel 19 may pack soil onto the deposited particulate material. A header 18 may provide the particulate material to respective row units 16. In the illustrated embodiment, a primary line 34 directs particulate material from the air cart 12 (e.g., a metering system 33 of the air cart) to the header 18. In certain embodiments, multiple primary lines may direct particulate material to multiple headers. Moreover, multiple secondary lines may extend from each header to respective row units. Furthermore, in certain embodiments, at least one secondary line may extend to a secondary header, and multiple tertiary lines may extend from the secondary header to respective row units. The lines and header(s) direct the particulate material from the air cart 12 to the row units 16 of the agricultural implement 10.

In the illustrated embodiment, the air cart 12 is towed behind the agricultural implement 10. For example, the agricultural implement 10 may be coupled to the work vehicle by a first hitch assembly, and the air cart 12 may be coupled to the agricultural implement 10 by a second hitch assembly 24. However, in other embodiments, the agricultural implement 10 may be towed behind the air cart 12. In further embodiments, the implement and the air cart 12 may be part of a single unit that is towed behind the work vehicle or may be elements of a self-propelled vehicle.

The air cart 12 may centrally store particulate material and distribute the particulate material to the header(s) 18. The air cart 12 includes a storage tank 26, a frame 28, wheels 30, and an air source 32. As illustrated, the towing hitch 24 is coupled between the tool frame 14 and the air cart frame 28, which enables the air cart 12 to be towed with the agricultural implement 10. Additionally, the storage tank 26 is configured to centrally store the particulate material. In some embodiments, the storage tank 26 may include multiple compartments for storing different types of particulate material. For example, a first compartment may store seeds while a second compartment may store a dry fertilizer. In such configurations, the air cart 12 may deliver both seeds and fertilizer to the implement 10 via separate distribution systems, or as a mixture through a single distribution system. Further, a compartment monitoring and control system 37 may be disposed in and/or proximate to the storage tank 26 and may be configured to monitor a profile of the particulate material within a respective storage compartment of the storage tank 26. For example, in certain embodiments, the agricultural system 13 may include multiple compartment monitoring and control systems, and each compartment monitoring and control system may be configured to monitor a profile of the particulate material within a respective storage compartment. In certain embodiments, the tank monitoring and control system 37 may determine a distribution rate of the particulate material based on a rate of change of the profile.

The particulate material may be fed from the storage tank 26 (e.g., from one or more storage compartments of the storage tank 26) into a metering system 33, which meters the particulate material, fluidizes the particulate material via a fluidizing airflow from the air source 32, and distributes the particulate material to the header(s) 18 via the primary line(s) 34. As depicted, the metering system 33 is mounted to the bottom of the storage tank 26. To facilitate distributing the particulate material, the fluidizing air generated by the air source 32 is guided into the metering system 33 via a plenum 36. In some embodiments, the air source 32 may include one or more pumps and/or blowers powered by electric and/or hydraulic motor(s), for example.

In certain embodiments, the compartment monitoring and control system 37 may control the metering system 33 to adjust or terminate the particulate material flow to the row units 16. For example, the compartment monitoring and control system 37 may adjust one or more parameters to control the amount of particulate material that flows through the metering system 33. In certain embodiments, one or more motors of a drive system of the metering system 33 may drive meter rollers of the metering system 33 to rotate, and the compartment monitoring and control system 37 may control the motor(s) to control the rotation rate of the meter rollers, thereby controlling the flow rate of the particulate material to the row units 16. The compartment monitoring and control system 37 may also instruct the metering system 33 to terminate operation to stop the distribution of the particulate material. Furthermore, in certain embodiments, the compartment monitoring and control system 37 may control the air source 32 (e.g., based on a distribution rate of the particulate material from the metering system 33, etc.). While the compartment monitoring and control system 37 is used with the air cart tank, in other embodiments, the compartment monitoring and control system 37 is used with a seeder such as the metering system 33.

Figure 2:
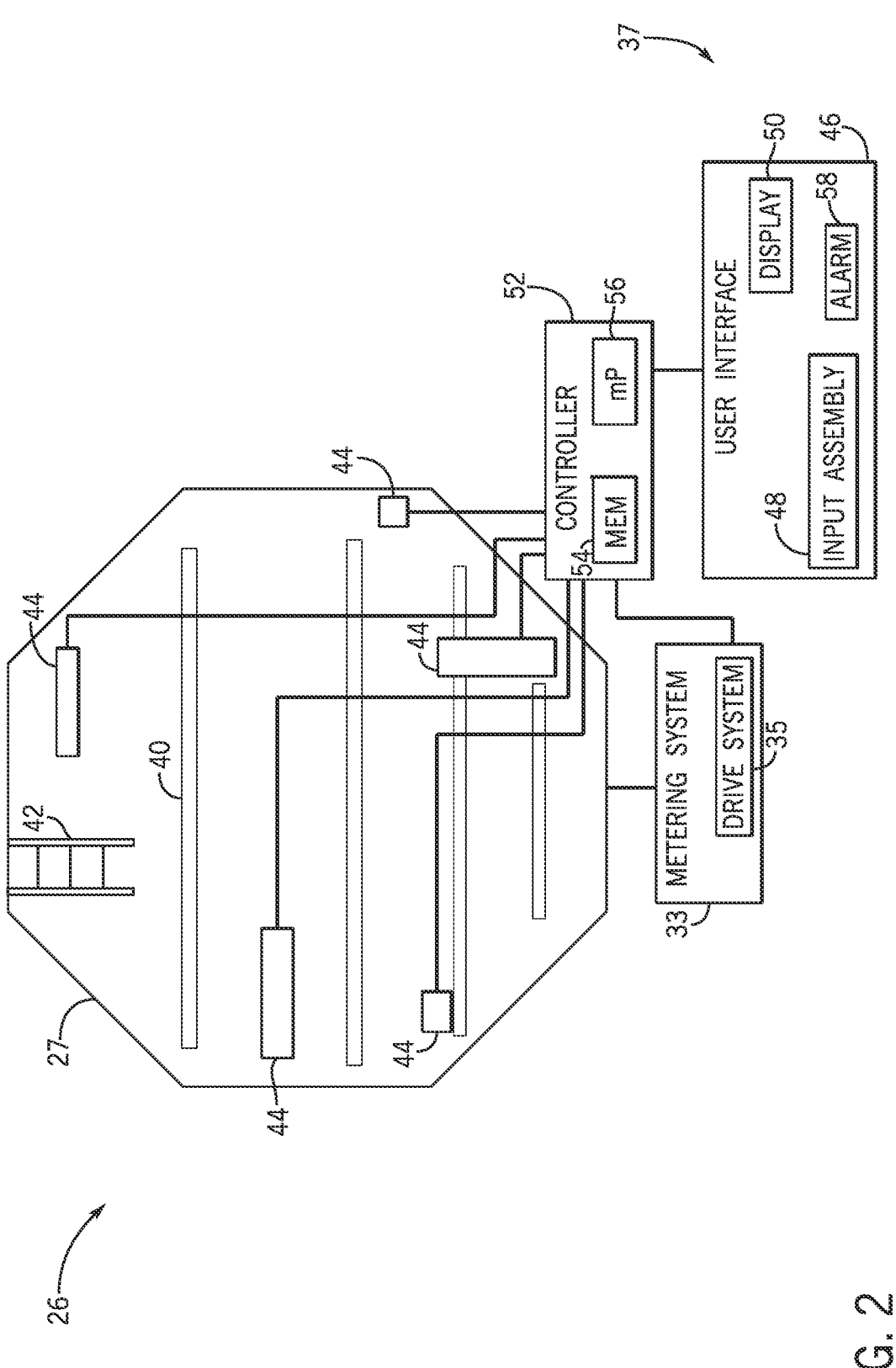
FIG. 2 is a perspective view of an embodiment of a compartment monitoring and control system that may be employed within the air cart of FIG. 1.

FIG. 2 is a perspective view of an embodiment of a compartment monitoring and control system 37 that may be employed within the air cart of FIG. 1. In the illustrated embodiment, the storage tank 26 includes a single storage compartment 27. However, as previously discussed, the storage tank may include multiple storage compartments. As illustrated, the storage compartment 27 includes four graduated markings 40. While the illustrated embodiment includes four markings 40, more or fewer markings may be employed in alternative embodiments (e.g., 2, 3, 5, 6, or more). For example, more graduated markings 40 may result in increased monitoring resolution. In the illustrated embodiment, the graduated markings 40 include lines extending across the storage compartment 27, and the spacing between the lines is based on a shape of the storage compartment 27. For example, the spacing between lines may be smaller in regions of the storage compartment having a larger cross-sectional area, and the spacing between the lines may be larger in regions of the storage compartment having a smaller cross-sectional area. In certain embodiments, the volumes of the storage compartment regions between pairs of adjacent lines may be substantially equal. While the graduated markings 40 include lines in the illustrated embodiment, in other embodiments, the graduated markings 40 may include other suitable markings (e.g., alone or in combination with the lines), such as dots, or numbers. For example, lines may extend across the storage compartment, and dots may be positioned between the lines. In another example, lines may extend across a portion of the storage compartment and a number may be adjacent to the line, indicative of a height. Furthermore, while the spacing between the markings varies based on the shape of the storage compartment in the illustrated embodiment, in other embodiments, the spacing between the markings may vary based on other suitable factors (e.g., the markings may be arranged in an exponential pattern), or the spacing between the markings may be equal. In certain embodiments, the graduated markings 40 may be different colors, reflective, or any combination thereof. Furthermore, in certain embodiments, the graduated markings 40 may include decals and/or appliques attached to an interior side of the storage compartment 27 (e.g., via an adhesive, via fastener(s), etc.). In such embodiments, the operator may enter the storage compartment 27 via a ladder 42 to add and/or remove a number of graduated markings 40. The operator may also clean the graduated markings 40 by wiping them, washing them, spraying them, removing them for cleaning, etc. Still, in other embodiments, the graduated markings 40 may be painted on an interior surface of the storage compartment 27 or formed (e.g., via laser cutting, molding, etching, etc.) on the interior surface of the storage compartment 27. For example, the graduated marking(s) 40 may be ridges within the interior surface of the storage compartment 27. The operator may use the ladder 42 to enter the storage compartment to paint a number of graduated markings 40.

In the illustrated embodiment, the compartment monitoring and control system 37 includes a user interface 46 configured to receive operator inputs and present visual and/or graphical data to the operator (e.g., including a representation of the particulate material profile within the storage compartment). The user interface 46 is configured to enable the operator to control certain parameter(s) associated with operation of the compartment monitoring and control system 37. In the illustrated embodiment, the user interface 46 includes an input assembly 48 and a display 50. The input assembly 48 may include one or more buttons, switches, knobs, or a combination thereof, for the operator to input commands and/or instructions, which may be presented on the display 50. For example, the operator may press a button of the input assembly 48 to initiate the particulate material distribution. The display 50 is configured to present information to the operator, such as a graphical representation of the particulate material distribution rate, the type of particulate material, a visual representation of certain parameter(s) associated with the particulate material distribution (e.g., the sensor data), the particulate material profile within the storage compartment, or a combination thereof. For example, the display 50 may present real-time or near real-time profiles of the particulate material within the storage compartment before, during, or after seeding operations. In certain embodiments, the display 50 may include a touchscreen interface that enables the operator to control certain parameters (e.g., distribution rate, particulate material type, etc.) associated with operation of the agricultural system. For example, the operator may use the display 50 to input the type of particulate material for distribution and the particulate material distribution rate before initiating the distribution.

In the illustrated embodiment, the user interface 46 is communicatively coupled to a controller 52. In addition, in the illustrated embodiment, the controller 52 includes a processor 56, such as a microprocessor, and a memory device 54. The processor 56 may be used to execute software, such as software for controlling the drive system 35 of the metering system 33. Moreover, the processor 56 may include multiple microprocessors, one or more "general-purpose" microprocessors, one or more special-purpose microprocessors, and/or one or more application specific integrated circuits (ASICS), or some combination thereof. For example, the processor 56 may include one or more reduced instruction set (RISC) or complex instruction set (CISC) processors.

The memory device 54 may include a volatile memory, such as random access memory (RAM), and/or a nonvolatile memory, such as read-only memory (ROM). The memory device 54 may store a variety of information and may be used for various purposes. For example, the memory device 54 may store processor-executable instructions (e.g., firmware or software) for the processor 56 to execute, such as determining a particulate material profile within the storage compartment based on sensor feedback. The storage device(s) (e.g., nonvolatile storage) may include ROM, flash memory, a hard drive, or any other suitable optical, magnetic, or solid-state storage medium, or a combination thereof. The storage device(s) may store data (e.g., particulate material information, distribution rates for types of particulate material, etc.), instructions (e.g., software or firmware for controlling the drive system 33), and any other suitable data. The processor 56 and/or the memory device 54, and/or additional processor(s) and/or memory device(s), may be located in any suitable portion(s) of the agricultural system.

In certain embodiments, the user interface 46 is configured to receive one or more inputs, such as a particulate material flow rate, a type of particulate material, an amount of particulate material within the storage compartment, other suitable inputs, or a combination thereof, and the user interface 46 is configured to output signal(s) indicative of the input(s) to the controller 52. By way of example, to initiate particulate material distribution, the operator may input one or more inputs to the user interface 46 regarding the particulate material to be distributed. In certain embodiments, the operator may input the type of particulate material to be distributed and the respective particulate material flow rate to the user interface 46 (e.g., via the display 50), and the user input may output signal(s) to the controller 52 indicative of the inputs. The controller 52 may receive the signal(s) and control the drive system 35 of the metering system 33 based on the type of particulate material and the particulate material flow rate.

In certain embodiments, the compartment monitoring and control system 37 may determine whether the input particulate material flow rate is within a threshold particulate material flow rate range. As previously discussed, the operator may input both the type of particulate material and the respective particulate material flow rate. By way of example, the operator may enter canola as the particulate material and 10 lb/acre as the particulate material flow rate. The controller 52 may receive the user inputs, and the controller 52 may determine that the threshold particulate material flow rate range for canola is 4.5 lb/acre to 5.5 lb/acre (e.g., via a table stored within the memory device 54, etc.). Because the input particulate material flow rate of 10 lb/acre is not within the threshold range of 4.5 lb/acre to 5.5 lb/acre, the controller 52 may output a control signal to the user interface 46 indicative of instructions to notify the operator. For example, the controller 52 may instruct the user interface display 50 to present an error message. Additionally or alternatively, the controller 52 may instruct an alarm 58 of the user interface 46 to activate, a light (e.g., LED) of the user interface to flash, a speaker of the user interface to make a sound, or a combination thereof, to alert the operator. In addition, the controller 52 may enable the operator to re-enter the inputs. In certain embodiments, the controller 52 may enable the operator to override the threshold particulate material flow rate range, thereby enabling distribution (e.g., seeding) operations to proceed with the inputs entered by the operator.

By way of further example, the input particulate material flow rate may be within the threshold particulate material flow rate range for the input particulate material type. For example, the operator may enter winter wheat as the particulate material type and 70 lb/acre as the particulate material flow rate. The controller 52 may determine that the input particulate material flow rate of 70 lb/acre is within the threshold particulate material flow rate range of 60 lb/acre to 80 lb/acre. As such, the controller 52 may activate the metering system 33 to initiate particulate material distribution, and the controller 52 may control the metering system 33 (e.g., the drive system 35 of the metering system 33) based on the inputs. Activation of the metering system 33 causes a flow of the particulate material from the storage tank 26 (e.g., the respective storage compartment 27 of the storage tank 26) to the row units fluidly coupled to the metering system 33.

The compartment monitoring and control system 37 may include at least one sensor 44 configured to output a sensor signal indicative of a profile (e.g., level, height, etc.) of the particulate material within the storage compartment 27. As further described herein, based on a type of sensor 44, the profile of the particulate material may be one-dimensional, two-dimensional, or three-dimensional. In the illustrated embodiment, the compartment monitoring and control system 37 includes five sensors 44 located at different areas of the storage compartment 27. While the compartment monitoring and control system 37 includes five sensors 44 in the illustrated embodiment, in other embodiments, the compartment monitoring and control system may include more or fewer sensors. For example, the compartment monitoring and control system 37 may include 1, 2, 3, 4, 6, 8, 10, 12, 14, or more sensors. The compartment monitoring and control system 37 may include a variety of sensor(s), such as ultrasonic sensor(s), ultraviolet sensor(s), load sensor(s), electrostatic sensor(s), inductive sensor(s), Light Detection and Ranging (LIDAR) sensor(s), radar sensor(s), camera(s), other suitable sensor(s), or a combination thereof, to monitor the profile of the particulate material. For example, the sensor(s) 44 may include one or more camera(s) disposed within the storage compartment 27. Each sensor 44 is configured to output a sensor signal indicative of the profile of particulate material disposed in the storage compartment 27 before, during, and/or after seeding operations.

In certain embodiments, the sensors 44 may include one or more cameras, and each camera may be configured to output a sensor signal (e.g., image, video, etc.) indicative of the profile of the particulate material disposed in the storage compartment 27 before, during, and/or after seeding operations. For example, each camera may capture an image with both the profile of the particulate material and the graduated markings 40. In certain embodiments, the controller 52 of the compartment monitoring and control system 37 may determine the profile of the particulate material based on one image with graduated marking(s) 40 and the particulate material. Furthermore, in certain embodiments, the camera is configured to move (e.g., rotate and/or translate) and capture multiple images with different views of the graduated marking(s) 40 and the particulate material. In this way, the controller 52 may combine the multiple images to form a two-dimensional profile In addition, in certain embodiments, multiple cameras may be disposed within the storage compartment 27 and configured to capture different views of the graduated marking(s) 40 and the particulate material. In embodiments in which multiple views of the graduated marking(s) 40 and the particulate material are captured, the controller 52 of the compartment monitoring and control system 37 may determine the profile of particulate material based on the multiple images.

The profile corresponds to the shape of the top surface of the particulate material disposed in the storage compartment 27. In certain embodiments, the camera is configured to capture the profile of the particulate material as a line relative to the interior of the storage compartment 27. In other embodiments, the camera is configured to capture an image with a surface of the particulate material across the length and width of the storage compartment 27. Still in another embodiment, the camera may be an infrared (IR) camera configured to capture a three-dimensional profile of the particulate material the IR spectrum. Additionally, the profile includes multiple levels distributed along the width and the length of the storage compartment 27. The profile of the particulate material within the storage compartment 27 may vary along the length and width of the storage due to clumping, uneven distribution, lateral and/or longitudinal transient loads, etc. In addition, the profile of the particulate material may vary based on the number of active meters (e.g., meter rollers, augers, etc.) in operation within the metering system 33. For example, certain metering systems include multiple meters that are individually controlled by the drive system. If all of the meters of the metering system 33 are operating, the profile of the particulate material within the storage compartment 27 may decrease while remaining substantially level. However, if only a portion of the meters are active, the profile of the particulate material within the storage compartment 27 may decrease more above the active meters and less above the inactive meters, thereby reducing the levelness of the profile. Due to variations in the levelness of the profile, the controller 52 may determine an average profile (e.g., level, height, etc.) based on the profile of the particulate material within the storage compartment 27. The controller 52 may then determine the volume of particulate material within the storage compartment 27 based on the average profile.

The sensors 44 may also include a LIDAR sensor, an ultrasonic sensor, an IR sensor, a radar sensor, other suitable sensor(s), or a combination thereof, and each sensor is configured to output a sensor signal indicative of the profile of the particulate material within the storage compartment 27. The sensors 44 are configured to operate in both the visible light spectrum or in other spectrums. For example, the sensor 44 may be a camera configured to capture images in the visible light spectrum of the storage compartment 27 interior. In another example, the LIDAR sensor is configured to determine the three-dimensional profile of the particulate material with light detection and generate images with both the graduated marking(s) 40 and the particulate material. The graduated marking(s) 40 may be ridges from on the interior surface of the storage compartment 27 that are detectable by the LIDAR sensor. Still in another example, the IR sensor may operate in the IR spectrum or in a visible light spectrum. The IR sensor also is configured to generate images that include the graduated marking(s) 40 and the particulate information. The sensor signal(s) indicative of the profile may be output from the sensor(s) 44 to the controller 52 of the compartment monitoring and control system 37. Data included in the sensor signal(s) may be stored in the memory device 54 of the controller 52. For example, image(s)/view(s) of the particulate material/graduated marking(s) from the camera(s) may be stored in the memory device 54. In certain embodiments, the storage compartment 27/compartment monitoring and control system 37 may include one or more light sources (e.g., LED(s)) to aid the sensors 44 in monitoring the profile. For example, at least one sensor 44 may include a camera configured to output a sensor signal indicative of an image of the particulate material and the graduated marking(s). The light source(s) may illuminate the interior of the compartment to enhance the quality of the image captured by the camera.

The sensor(s) 44 are communicatively coupled to the controller 52, and the controller 52 is configured to receive the sensor signal(s) from the sensor(s). In certain embodiments, each sensor is configured to output a series of sensor signals indicative of a corresponding series of images of the particulate material within the storage compartment and at least one graduated marking on the storage compartment during a period of operation of the metering system. The controller 52 is configured to receive the series of sensor signals from the sensor(s) and to determine a series of profiles of the particulate material within the storage compartment based on the series of images. For example, the controller 52 is configured to determine the height of the particulate material within the storage compartment 27 relative to the graduated markings 40. In an embodiment, the controller 52 may determine the height of the particulate material based on a camera image of the particulate material profile relative to the graduated markings 40. In another example, the profile of the particulate material may be between two graduated markings 40 and the controller 52 is configured to interpolate between markings 40 to determine the profile of the particulate material. The controller 52 is configured perform a linear or a non-linear interpolation between two points (e.g., first graduated marking and second graduated marking) based on the spacing of the graduated markings 40 to determine the profile of the particulate material. In addition, the controller 52 is configured to determine a volumetric rate of change of the particulate material based on the series of profiles and to control the metering system based on the volumetric rate of change.

For example, the controller 52 may receive sensor signal(s) indicative of the image(s) before particulate material distribution is initiated. The controller 52 may then receive sensor signal(s) at any suitable time interval (e.g., 1 minute, 10 minutes, etc.) during the period of operation of the metering system 33. The controller 52 may analyze the series of images to determine the particulate material distribution rate. For example, the controller 52 may determine a series of profiles based on the series of images, in which each profile is determined at a corresponding time interval. Next, the controller 52 may determine a volumetric rate of change of the particulate material based on the series of profiles. In certain embodiments, the controller 52 may determine the particulate material distribution rate based on the volumetric rate of change and the particulate material type (e.g., by multiplying a density of the particulate material by the volumetric flow rate).

If a difference between the determined particulate material distribution rate and the input particulate material distribution rate is greater than a threshold value, the controller 52 may output a control signal indicative of instructions to inform the operator of the inconsistency. In addition, the user interface 46 may present information to the operator (e.g., via the display 50) of a graphical representation of a profile, the determined particulate material distribution rate, the input particulate material distribution rate, the volumetric rate of change, the threshold value, or a combination thereof. Based on the display of information, the operator may change one or more parameters of the metering system 33 to control the particulate material distribution rate. For example, if the determined particulate material distribution rate is greater than the input particulate material distribution rate, the operator may reduce the speed of the meters of the metering system 33. Additionally or alternatively, the controller 52 may automatically control the metering system 33 based on the determined particulate material distribution rate/volumetric rate of change. For example, if the controller 52 determines that the determined particulate material distribution rate is less than the input particulate material distribution rate, the controller 52 is configured to output a control signal indicative of instructions for the drive system 35 to operate at a higher speed to increase the particulate material distribution rate. If adjusting the flow of particulate material does not reduce a difference between the determined particulate material distribution rate and the input particulate material distribution rate below a threshold value, the controller 52 is configured to terminate the particulate material distribution. For example, the controller 52 is configured to terminate power to the drive system 35 of the metering system 33.

Figure 3:
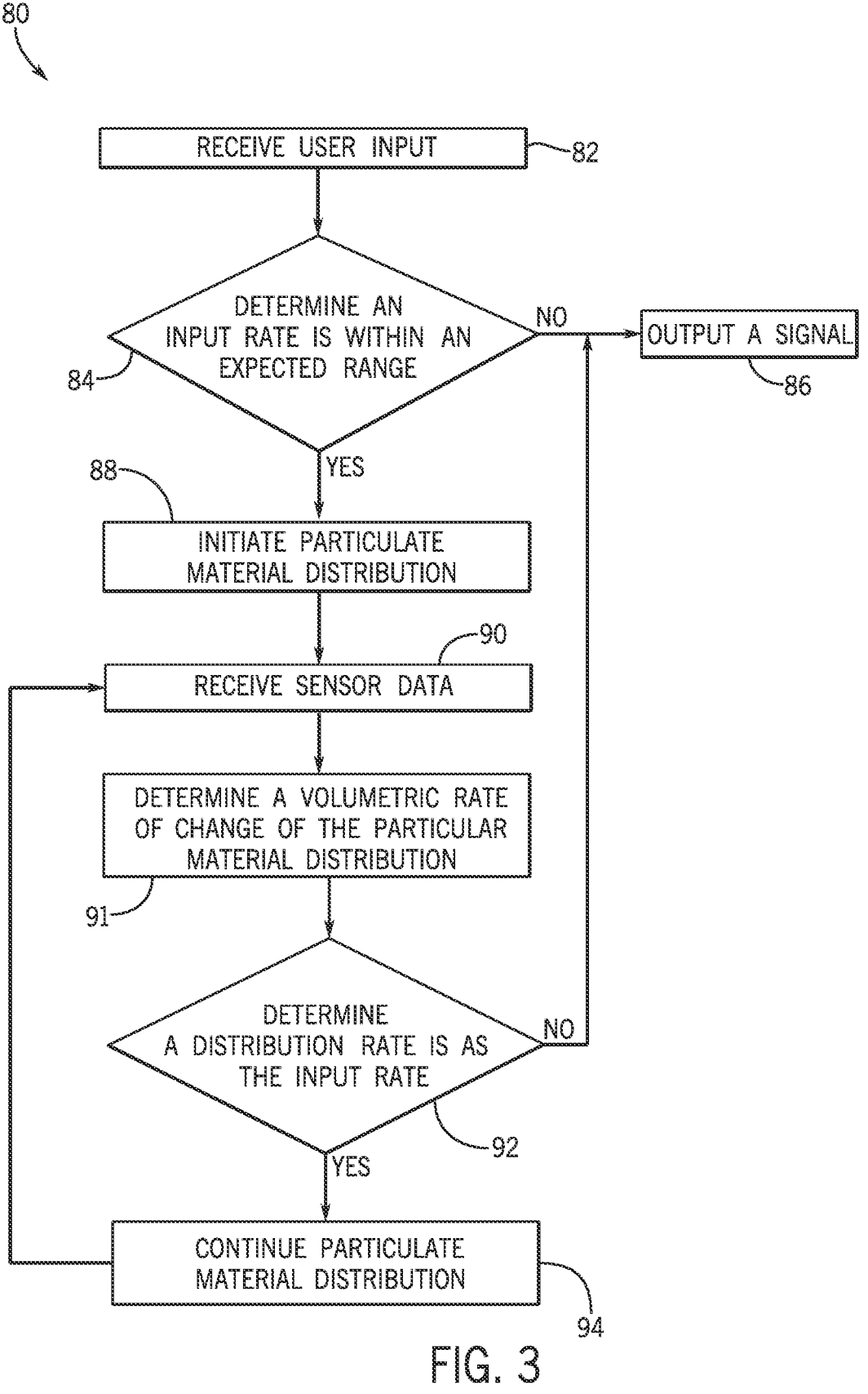
FIG. 3 is a flow diagram of an embodiment of a method for monitoring and controlling particulate material distribution for an air cart.

FIG. 3 is a flow diagram of an embodiment of a method 80 for monitoring and controlling particulate material distribution. First, as represented by block 82, the controller is configured to receive user input via the user interface. For example, the user (e.g., operator) may indicate to the user interface to display sensor data from sensor(s) within the storage compartment. In response, the operator may view the profile of the particulate material within the storage compartment before, during, and/or after operation. By way of example, in certain embodiments, at least one sensor is a camera capable of real-time transmission of image data, such that the operator may view a stream of images of the profile of particulate material within the storage compartment. As such, the user input to the user interface may be a request to view the profile of the particulate material in real-time.

Furthermore, in certain embodiments, the user input to the user interface may be a request to initiate a distribution. As such, the user input may include a type of particulate material, an input particulate material distribution rate, an amount of particulate material, a threshold range, a threshold value, a desired work vehicle speed, or any combination thereof. The user interface may include a display that enables the user to select the type of particulate material from a list of particulate materials that have corresponding information stored in a memory device. That is, after the operator selects the type, the controller is configured to retrieve information regarding the particulate material, such as an input particulate material distribution rate range, a size, tolerance interval, etc. By way of example, the operator may select canola seeds from a list, manually input the particulate material distribution rate, and an amount of seeds for distribution. The controller is configured to use the type of particulate material and the amount to determine an input particulate material distribution rate range and an estimated length of operation.

At block 84, the compartment monitoring and control system may determine whether the input particulate material distribution rate is within a range (e.g., threshold range) for the particulate material. The input particulate material distribution rate is a rate of distribution entered by the operator via the user interface. For example, the input particulate material distribution rate is a seeding rate for a seed product and/or an application rate for a fertilizer product. The threshold range is the threshold rate range of distribution for a respective type of particulate material. In certain embodiments, the received user input may include an input particulate material distribution rate. For example, the operator may select canola seeds for distribution and enter an input particulate material distribution rate of 10 lb/acre via the user interface. The controller is configured to receive this user input and retrieve data on canola seeds (e.g., from a look-up table stored in the memory device) to determine the threshold range. Based on the data, the controller is configured to determine that threshold range for canola seed distribution is 4.5 lb/acre to 5.5 lb/acre. As such, the controller is configured to determine that the received user input of 10 lb/acre is inconsistent and output a control signal indicative of this inconsistency to the user interface, which is configured to display a message requesting the operator to confirm, adjust, or deny that the 10 lb/acre distribution rate is the target input particulate material distribution rate. As such, the controller is configured to provide assistance in selecting the particulate material distribution rate to reduce waste and improve efficiency.

In another embodiment, the controller is configured to determine the input particulate material distribution rate based on the user input. For example, the operator may input canola seeds as the particulate material for distribution, and the controller is configured to retrieve data on canola seeds from the memory device. The controller is configured to determine the input rate of canola seeds from the data and output a control signal to the user interface indicative of instructions to display the input rate from the data. In another example, the operator may input a length of operation and an amount of particulate material, but not include a type of particulate material being distributed. As such, the controller is configured to determine the input particulate material distribution rate and the type of particulate material from the user input.

If the input particulate material distribution rate is not within the threshold range for the particulate material, at block 86, the controller is configured to output a control signal to notify the operator. In certain embodiments, the controller is configured to output a control signal to the user interface indicative of instructions for user confirmation, denial, or adjustment of the input particulate material distribution rate. For example, the operator may have entered an incorrect input particulate material distribution rate and may choose to adjust the input particulate material distribution rate in response to the notification. The operator may use the user interface to enter a new input rate. In another example, the controller is configured to output a control signal to the user interface indicative of instructions to display the input particulate material distribution rate identified by the controller. The operator may acknowledge the controller input particulate material distribution rate and confirm the new rate.

If the input particulate material distribution rate is within the threshold range, then at block 88, the controller causes the metering system to initiate the particulate material distribution. Initiating particulate material distribution activates one or more motors of the metering system and one or more motors of the fan or blower to cause the particulate material to flow from the storage compartment and to be distributed to the row units. The controller is configured to output a control signal to the metering system indicative of instructions to initiate a flow of the particulate material from the storage compartment. As such, the amount of particulate material within the storage compartment may decrease during distribution of the particulate material.

At block 90, one or more sensors within the storage compartment are configured to output sensor signal(s) to the controller indicative of a profile of the particulate material within the storage compartment. Each sensor is configured to output a sensor signal indicative of images, video, or measurements indicative of the profile to the controller. For example, the one or more sensors may include camera(s) that capture one or more images of the particulate material and one or more graduated markings within the storage compartment. Each camera is configured to capture images of the profile of the particulate material within the storage compartment. The controller is configured to analyze the one or more images to determine a profile of the particulate material based on a position of the top surface of the particulate material relative to the graduated marking(s) and/or based on which graduated marking(s) are visible. In certain embodiments, the storage compartment profile monitoring and control system includes multiple cameras configured to capture different views of the storage compartment interior. Furthermore, in certain embodiments, the controller is configured to determine an average level of the particulate material by taking an average of the determined profile from the images. Additionally or alternatively, the LIDAR sensor(s), the IR sensor(s), the radar sensor(s), or a combination thereof may generate an image in a different spectral and output sensor signals(s) to the controller indicative of a profile of the particulate material within the storage compartment.

In certain embodiments, the controller is configured to use image processing to determine a shape, a size, a type, or a combination thereof, of each particle of the particulate material based on the sensor data. The controller is configured to use the graduated markings to determine how far a particle is from a side of the storage compartment. For example, the graduated markings are a known size and distance from the camera(s), which enables the controller to determine the size of particulate material. Additionally or alternatively, the controller is configured to use image processing to determine the shape of particulate material and match the shape with a shape in the memory device to determine the type of particulate material.

In certain embodiments, the controller is configured to determine a particulate material distribution rate based on the sensor data. For example, the camera is configured to capture images of the storage compartment at different time intervals (e.g., at 0 minutes, 1 minute, 10 minutes, and 15 minutes after particulate material distribution is initiated, at zero minutes and at every one minute after particulate material distribution is initiated, at zero minutes and at every five minutes after particulate material distribution is initiated, etc.) and determine a particulate profile for each of the captured images. For each of the particulate profiles, the controller determines a level of particulate material. Then, the controller is configured to use the series of particulate profiles to determine a volumetric rate of change of the particulate material. The controller is also configured to determine the difference(s) in profile between the intervals by comparing the profile of the particulate material at each interval. Then, the controller is configured to determine the volumetric rate of change using the profiles of particulate material and the time interval. The controller is then configured to control the metering system based on the volumetric rate of change.

At block 91, the compartment monitoring and control system is configured to determine the particulate material distribution rate based on the volumetric rate of change. In certain embodiments, the volumetric rate of change is correlated to the particulate material distribution rate. The distribution rate may be determined based on the grain size and/or shape of the particulate material, the implement type, the type of particulate material being distributed, the operations being performed, or a combination thereof. In an embodiment, the controller is configured to use the volumetric rate of change and the grain size of particulate material to determine the distribution rate. In other embodiments, the controller is configured to use the volumetric rate of change, the seeding operation, and the grain shape of the particulate material to determine the distribution rate.

At block 92, the compartment monitoring and control system is configured to determine whether a difference between the particulate material distribution rate and the input particulate material distribution rate is less than a threshold value. The compartment monitoring and control system is configured to the particulate material distribution rate from the sensor data and compare it to the input particulate material distribution rate determined at block 84.

If the difference between the particulate material distribution rate and the input rate is greater than the threshold value, then the process may return to block 86, in which the compartment monitoring and control system is configured to notify the operator of the variation. For example, the controller is configured to output a control signal to an indicator indicative of instructions to activate. The indicator may light up, change colors, produce a sound, or a combination thereof, to inform the operator. In another example, the controller is configured to output a control signal to the user interface indicative of instructions to display a message to notify the operator. As such, the operator may stop the distribution and resolve the issue after being notified of the inconsistency.

If the difference between the particulate material distribution rate and the input particulate material distribution rate is less than or equal to the threshold value, then at block 94, the controller is configured to output a control signal to the metering system indicative of instructions to initiate/continue the particulate material distribution. In certain embodiments, the controller is configured to not output the control signal, rather the metering system is configured to continue operation with the parameter(s) determined at block 88. The process may then return to block 90, in which the controller is configured to receive additional sensor data.

After successful completion of the particulate distribution, the operator may indicate to the compartment monitoring and control system to shut down or stop operation. For example, the operator may indicate on the user interface to end particulate distribution by pressing a button, turning a knob, or a combination thereof. In certain embodiments, the controller is configured to determine that the profile of the particulate material is substantially zero, indicating substantially all the particulate material has been distributed. In response, the controller is configured to automatically output a control signal to the metering system indicative of instructions to terminate operation. Then, the controller is configured to output a control signal to the user interface indicative of instructions to notify the operator of the completed distribution. As such, the compartment monitoring and control system may promote an efficient and cost-effective method for particulate material distribution. The method described above may be stored on one or more tangible, non-transitory, machine-readable media and/or may be performed by the processor of the controller described above with reference to FIG. 3 and/or on other suitable controller(s). The steps of the method 80 may be performed in the order disclosed above or in any other suitable order. Furthermore, certain steps of the method may be omitted. For example, in certain embodiments, the step of outputting a signal in response to determining the difference between the particulate material distribution rate and the input particulate material distribution rate may be omitted.

Figure 4:
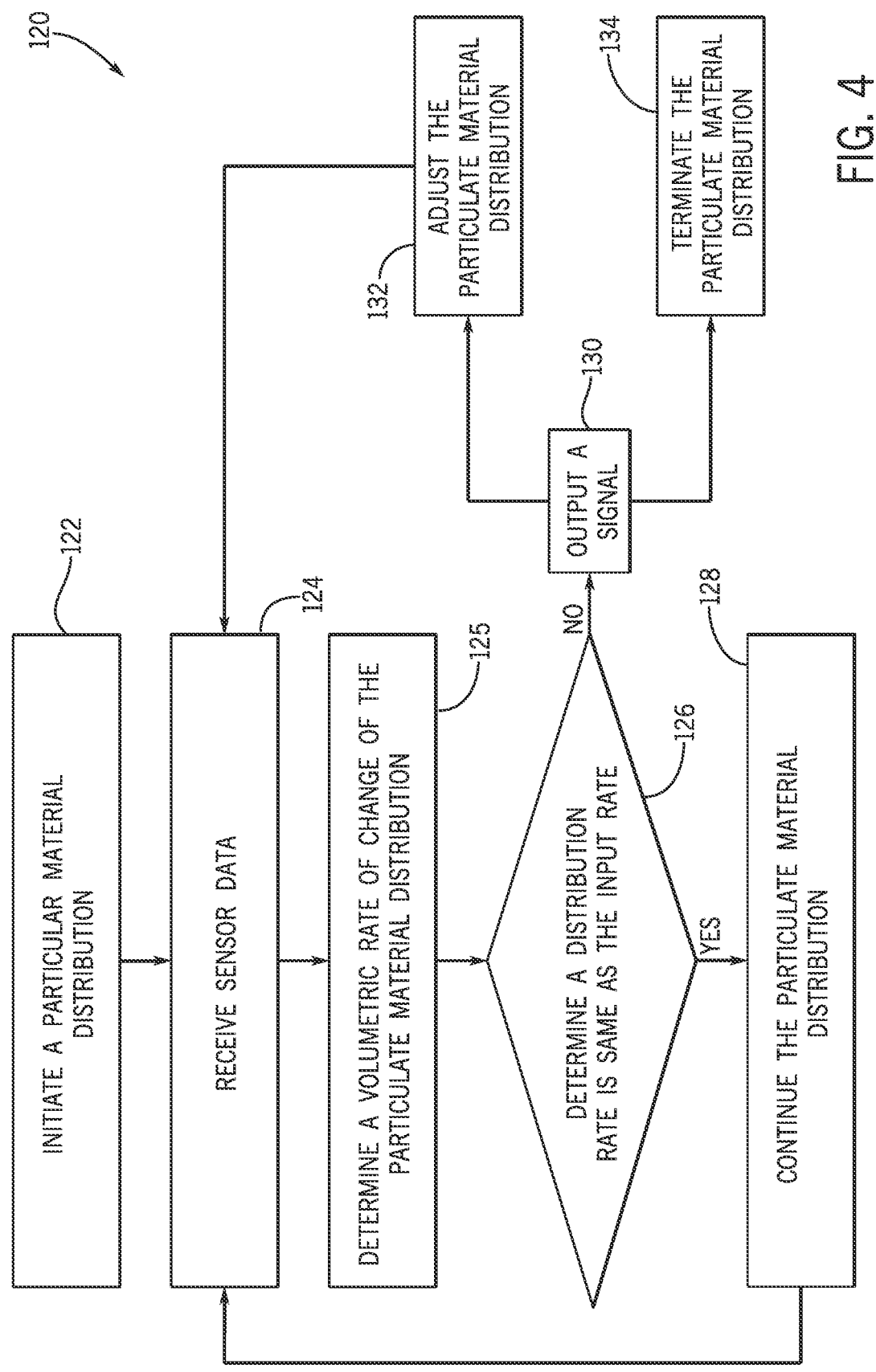
FIG. 4 is a flow diagram of an embodiment of a method for monitoring and controlling particulate material distribution for an air cart.

FIG. 4 is a flow diagram of an embodiment of a method 120 for monitoring and controlling particulate material distribution. The compartment monitoring and control system is configured to receive user input via the user interface. For example, the operator may to press a button or use a display of the user interface to initiate a particulate material distribution. The operator input may include a type of particulate material, an input particulate material distribution rate, an amount of particulate material, a threshold range, a threshold value, a desired work vehicle speed, or any combination thereof. Further, the operator input may include one or more preset particulate material(s) and one or more associated properties (e.g., distribution rate, size, shape, etc.). The controller is configured to receive the user input and determine the input rate. For example, based on the type of particulate material, the controller is configured to determine the input rate by retrieving data from the memory device. In another example, the controller is configured to receive the input rate and/or the type of particulate material as part of the user input. The controller is configured to determine if the input rate is within the threshold range based on the data for the particulate material stored in the memory device. In certain embodiments, the input rate is within the threshold range, and at block 122, the controller is configured to initiate a particulate distribution. For example, the controller is configured to active the metering system to initiate particulate material distribution according to the input rate.

At block 124, the compartment monitoring and control system is configured to receive sensor data from one or more sensors within the storage compartment. The sensors are configured to output sensor signal(s) indicative of a profile of particulate material and one or more graduated markings within the storage compartment. For example, the one or more sensors may include a video camera that captures multiple images of the profile of the particulate material within the storage compartment. During distribution operations, the operator may want to verify that the profile of particulate material is changing (e.g., decreasing) as expected. The operator may, via the user interface, request to view a continuous stream of sensor data by pressing a button. In this manner, the operator may visually verify the particulate material distribution rate. In another embodiment, the controller is configured to receive the sensor data from the sensors within the storage compartment. For example, the one or more sensor(s) may include the LIDAR sensor, the radar sensor, IR sensor, or a combination thereof. The LIDAR sensor is configured to capture one or more images of the particulate material and one or more graduated markings within the storage compartment and transmit the one or more images to the controller.

In certain embodiments, the compartment monitoring and control system is configured to determine the profile of the particulate material within the storage compartment. For example, the controller is configured to use image processing to determine a profile of the particulate material within the compartment. For example, the sensor data may be an image capture of the particulate material and the graduated markings. The controller is configured to perform image processing to determine the grain size and/or a shape of the particulate material. Based on the image analysis, the controller is configured to determine a type of particulate material and retrieve data about the type of particulate material from the memory device. The controller is also configured to determine the profile of the particulate material by analyzing the particulate material and the graduated markings of the sensor data. Since the graduated markings provide a known distance and/or level within the storage compartment, the controller is configured to determine the profile of the particulate material within the storage compartment. The controller is configured to determine the distribution rate of the particulate material from two images within the storage compartment after a pre-determined amount of time (e.g., 1 minute, 10 minutes, 15 minutes).

At block 125, the compartment monitoring and control system is configured to determine a particulate material distribution rate based on the sensor data. The one or more sensors is configured to generate image data at different time intervals and transmit the images to the controller. Before and during distribution operations, the camera is configured to capture images of the storage compartment with the particulate material and the graduated markings. The controller is configured to receive the images and determine a profile of the particulate material within the storage compartment. Based on the profile of the particulate material, the controller is configured to determine a level of the particulate material and further determine a volumetric rate of change of the particulate material. In an embodiment, the controller is configured to determine differences in profile between each image taken at different time intervals. As such, the controller is configured to determine the volumetric rate of change during the distribution operation.

The controller is configured to determine the particulate material distribution rate based on the volumetric rate of change. For example, the controller is configured to determine the particulate material distribution rate based on the volumetric rate of change and the grain size or grain shape. In another example, the controller is configured to determine the particulate material distribution rate based on the volumetric rate of change, the implement, and the grain size of the particulate material.

At block 126, the compartment monitoring and control system is configured to determine whether the distribution rate determined at block 124 is the same as the input rate received at block 122 for the respective particulate material. For example, the controller is configured to determine whether the distribution rate determined based on the sensor data is within the threshold range of for the particulate material received from the memory device. The input rate may include a tolerance level comprising one or more standard deviations. As such, the input rate may include the threshold range to account for different sizes and shapes within the particulate material.

In certain embodiments, the compartment monitoring and control system is configured to determine the distribution rate is the same as the input rate. At block 128, the compartment monitoring and control system is configured to continue the particulate material distribution. For example, the controller is configured to output a control signal to the metering system indicative of instructions to continue particulate material distribution according to the input rate determined at block 122. Alternatively, the controller is configured not to output a control signal, thereby allowing the metering system to continue operation.

In certain embodiments, the compartment monitoring and control system is configured to determine the difference between the particulate material distribution rate and the input rate is greater than the threshold value. For example, the distribution rate may be greater than or lower than the input rate. Then, at block 130, the compartment monitoring and control system is configured to output a signal (e.g., control signal). The controller is configured to output a control signal to an indicator and/or the metering system. For example, the controller is configured to output the control signal to the user interface indicative of instructions to display a message. For example, the user interface may display a pop-up, a button, a graphical or visual representation of the difference between the distribution rate and the input rate. As such, the operator may terminate the distribution and resolve the issue. In certain embodiments, the operator may adjust one or more inputs, such as the distribution rate, the type of particulate material, or a combination thereof. Further, the operator may stop distribution operations and check the metering system to attempt to bring the distribution rate within the threshold range. For example, the operator may check the header for stuck particulate material that may block distribution. The operator view the profile of the particulate material via the display and the sensor(s) may transmit images or videos of the storage compartment.

The operator may also adjust the plurality of inputs and request the controller to recalculate the input rate and/or ensure that the correct input rate is entered. For example, the operator may accidently input winter wheat instead of canola seeds as the type of particulate material being distributed. The operator may recognize this error and correct the type of particulate material and indicate to the controller to reinitiate the distribution via the user interface. In response to adjusting one or more parameters, the controller is configured to reinitiate the particulate material distribution mode.

In certain embodiments, the controller is configured to transmit a control signal to an indicator indicative of instructions to activate. For example, an alarm of the display is configured to flash a light, create a sound, or a combination thereof to alert the operator of the variation. As such, the operator may terminate the distribution operation and resolve the issue. For example, at block 122, the operator may have entered winter wheat as the type of particulate material instead of canola seeds. The operator may recognize this error and update the type of particulate material via the display. The controller is configured to receive the updated type of particulate material and reinitiate the particulate material distribution.

In an embodiment, at block 132, the compartment monitoring and control system is configured to adjust one or more parameters of the particulate material distribution to attempt to bring the distribution rate within the threshold range. The controller is configured to output a control signal to the drive system of the metering system to control the rotation rate of the meter rollers, thereby controlling the flow rate of particulate material to the row units. In another example, the controller is configured to output a control signal to the air source, thereby changing the airflow to increase or decrease the rate of particulate material distribution. Then, the process may return to block 124 to receive additional sensor data and determine if the distribution rate is the same as input rate.

In certain embodiments, the compartment monitoring and control system is configured to terminate the particulate distribution. At block 134, the compartment monitoring and control system may transmit a control signal to the metering system indicative of instructions to terminate the distribution. In response to receiving the control signal, the metering system is configured to cut off power, stop one or more wheels from turning, close a valve, or a combination thereof to stop distributing particulate material. In certain embodiments, the controller is configured to output a control signal to the user interface indicative of instructions to notify the operator of the terminated operation. As such, the compartment monitoring and control system may prevent the incorrect particulate material from being distributed, save costs, and improve efficiency. The method described above may be stored on one or more tangible, non-transitory, machine-readable media and/or may be performed by the processor of the controller described above with reference to FIG. 4 or on another suitable controller. The steps of the method 120 may be performed in the order disclosed above or in any other suitable order. Furthermore, certain steps of the method may be omitted. For example, in certain embodiments, the step of outputting a signal in response to determining the distribution rate is not the same as the input rate may be omitted.

It should be appreciated that the compartment profile monitoring and control system may be adapted for on-demand storage systems (e.g., planters), or other implements including a storage tank. The technical effects of the systems and methods described herein include utilizing sensor data to determine a series of profiles of particulate material within a storage system and determining a particulate material distribution rate. Such on demand information may enable the operator to verify the particulate material distribution rate in real-time (or near real-time) by viewing visual and/or graphical data (e.g., including representation of the particular material profile within the storage compartment). Further, the compartment profile monitoring and control system may determine the particulate material distribution rate is within a threshold range and warn the operator that the particulate distribution rate is too high or too low. Accordingly, monitoring particulate material distribution rate may optimize seeding operations.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A storage compartment profile monitoring and control system for an agricultural system, comprising:
   at least one sensor configured to output a series of sensor signals indicative of a corresponding series of images of particulate material within a storage compartment and at least one graduated marking on the storage compartment at a time interval during a period of operation of a metering system configured to meter the particulate material from the storage compartment, wherein the time interval corresponds to a duration between images of the series of images; and
   a controller comprising a memory and a processor, wherein the controller is communicatively coupled to the at least one sensor, and the controller is configured to:
      receive the series of sensor signals at the time interval from the at least one sensor;
      determine a series of profiles of the particulate material within the storage compartment based on the series of images, wherein each profile of the series of profiles is determined for a respective image of the series of images;
      determine a volumetric rate of change of the particulate material based on the series of profiles and the time interval;
      determine a particulate material distribution rate based on the volumetric rate of change; and
      control the metering system based on a comparison between the particulate material distribution rate and a target particulate material distribution rate.

2. The compartment monitoring and control system of claim 1, wherein the at least one sensor comprises only a single camera.

3. The compartment monitoring and control system claim 1, wherein the controller is configured to determine a series of average levels of the particulate material within the storage compartment based on the series of profiles, and the controller is configured to determine the volumetric rate of change of the particulate material based on the series of average levels.

4. The compartment monitoring and control system of claim 1, wherein the at least one graduated marking on the storage compartment comprises a dot, a line, or both.

5. The compartment monitoring and control system of claim 1, wherein the at least one graduated marking comprises a decal, an applique, or a combination thereof.

6. The compartment monitoring and control system of claim 1, wherein the controller is configured to:
   output a control signal to a display indicative of instructions to display an indication that a difference between the particulate material distribution rate and the target particulate material distribution rate is greater than a threshold value.

7. The compartment monitoring and control system of claim 1, wherein the controller is configured to output an additional control signal indicative of adjusting one or more parameters of the metering system in response to determining a difference between the particulate material distribution rate and the target particulate material distribution rate.

8. The compartment monitoring and control system of claim 1, wherein the controller is configured to determine a size, a shape, a type, or a combination thereof, of at least one particle of the particulate material based on the series of sensor signals.

9. The compartment monitoring and control system of claim 1, wherein the at least one sensor comprises a plurality of cameras.

10. A compartment monitoring system and control system for a storage compartment, comprising:
   at least one sensor configured to output a series of sensor signals indicative of a corresponding series of images of particulate material within the storage compartment and at least one graduated marking on the storage compartment; and
   a controller comprising a memory and a processor, wherein the controller is communicatively coupled to the at least one sensor, and the controller is configured to:
      receive the series of sensor signals from the at least one sensor;
      determine a series of profiles of the particulate material within the storage compartment based on the series of images;
      determine a series of average levels of the particulate material within the storage compartment based on the series of profiles;
      determine a volumetric rate of change of the particulate material based on the series of average levels;
      determine a particulate material distribution rate based on the volumetric rate of change;
      compare the particulate material distribution rate to a target particulate material distribution rate; and
      control a metering system based on the comparison.

11. The compartment monitoring and control system of claim 10, wherein the at least one graduated marking is painted or molded to an interior surface of the storage compartment.

12. The compartment monitoring and control system of claim 10, wherein the at least one graduated marking comprises a decal, an applique, or a combination thereof.

13. The compartment monitoring and control system of claim 10, wherein the at least one graduated marking comprises lines, dots, or a combination thereof.

14. The compartment monitoring and control system of claim 10, wherein the at least one graduated marking comprises a plurality of markings assembled non-linearly.

15. A method, comprising:

receiving, via a controller, a series of sensor signals at a time interval from at least one sensor within a storage compartment, wherein the series of sensor signals is indicative of a corresponding series of images of particulate material within the storage compartment and at least one graduated marking on the storage compartment, and the time interval corresponds to a duration between images of the series of images;

determining, via the controller, a series of profiles of the particulate material within the storage compartment based on the series of images, wherein each profile of the series of profiles is determined for a respective image of the series of images;

determining, via the controller, a volumetric rate of change of the particulate material based on the series of profiles and the time interval;

determining, via the controller, a particulate material distribution rate based on the volumetric rate of change; and comparing, via the controller, the particulate material distribution rate to a target particulate material distribution rate; and controlling, via the controller, a metering system based on the comparison.

16. The method of claim 15, comprising:

outputting, via the controller, a control signal indicative of terminating an operation of the metering system in response to determining that a difference between the particulate material distribution rate and the target particulate material distribution rate is greater than a threshold value.

17. The method of claim 15, comprising:

outputting, via the controller, a control signal indicative of adjusting one or more parameters of the metering system in response to determining that the particulate material distribution rate and the target particulate material distribution rate are different.

18. The method of claim 15, comprising:

determining, via the controller, a series of average levels of the particulate material within the storage compartment based on the series of profiles; and determining, via the controller, the volumetric rate of change of the particulate material based on the series of average levels.

19. The method of claim 15, comprising:

determining, via the controller, a size and a shape of at least one particle of the particulate material based on the series of sensor signals;

determining, via the controller, a type of particulate material based on the size and the shape of the at least one particle of the particulate material; and determining, via the controller, the target particulate material distribution rate based on the type of particulate material.

*  *  *  *  *